Oct. 24, 1967  L. M. HUDSON  3,348,900

FOUR COMPONENT SYMMETRICAL COPYING OBJECTIVE

Filed June 25, 1964

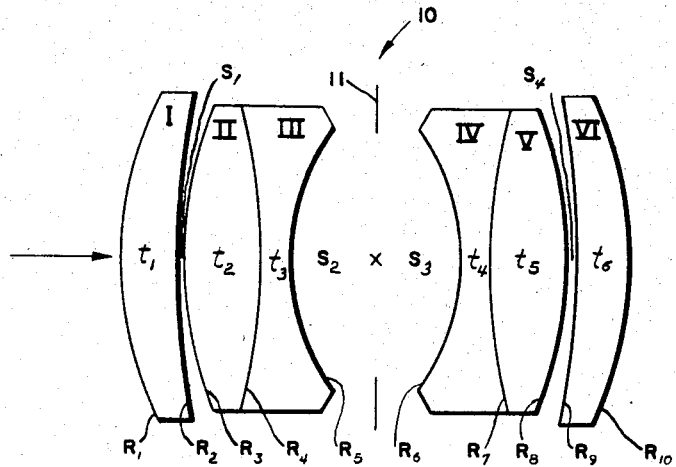

FIG. 1

| E.F. = 100 mm | F.F. = B.F. = 77.56mm | | f/3.8 | F.A.= 40° | |
|---|---|---|---|---|---|
| LENS | RADII | THICKNESSES | SPACES | $n_D$ | $\nu$ |
| I | $R_1 = 28.27$ | $t_1 = 4.30$ | $S_1 = 0.23$ | 1.5725 | 57.4 |
|   | $R_2 = 127.15$ | | | | |
| II | $R_3 = 32.17$ | $t_2 = 5.98$ | $S_2 = 6.70$ | 1.5725 | 57.4 |
|   | $-R_4 = 46.57$ | | | | |
| III | $R_5 = 17.52$ | $t_3 = 2.30$ | | 1.5838 | 46.0 |
| IV | $-R_6 = 17.52$ | $t_4 = 2.30$ | $S_3 = 6.70$ | 1.5838 | 46.0 |
| V | $R_7 = 46.57$ | $t_5 = 5.98$ | | 1.5725 | 57.4 |
|   | $-R_8 = 32.17$ | | | | |
| VI | $-R_9 = 127.15$ | $t_6 = 4.30$ | $S_4 = 0.23$ | 1.5725 | 57.4 |
|   | $-R_{10} = 28.27$ | | | | |

ALL SCALAR QUANTITIES GIVEN IN MILLIMETERS

FIG. 2

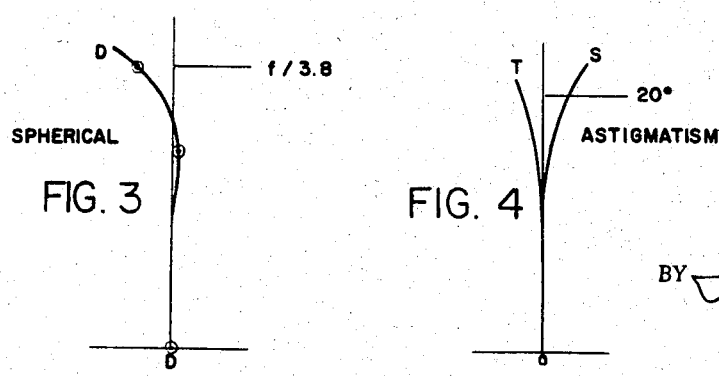

FIG. 3  SPHERICAL  f/3.8

FIG. 4  ASTIGMATISM  20°

LENA M. HUDSON
INVENTOR

BY Frank C. Parker

ATTORNEY

United States Patent Office 3,348,900
Patented Oct. 24, 1967

3,348,900
FOUR COMPONENT SYMMETRICAL COPYING OBJECTIVE
Lena M. Hudson, Brighton, N.Y., assignor to Bausch & Lomb Incorporated, Rochester, N.Y., a corporation of New York
Filed June 25, 1964, Ser. No. 378,005
2 Claims. (Cl. 350—209)

ABSTRACT OF THE DISCLOSURE

A copying lens having a relative aperture at least as great as $f/3.8$ and a total field angle of at least 40° for use in copying and processing work, the image formed thereby being characterized by very low distortion and curvature of field while having an excellent state of correction for spherical and chormatic aberrations, coma and astigmatism.

---

The present invention relates to a symmetrical type of optical objective for coyping and process projection purposes at substantially unity magnification and more particularly relates to improvements in such objectives.

Objectives which are used for the aforesaid purposes usually require an abnormally large field angle compared to ordinary objectives so that correction of the image aberrations in the outermost parts of the field are more difficult to accomplish. Although the usual relative aperture of a copying lens is around $f/8.0$, certain installations of copy lenses may require more speed which presents a further problem in providing a well-corrected copying objective.

It is an object of the present invention to provide a novel optical objective of symmetrical form which is simple in structure and involves the use of comparatively low index glasses for achieving the least cost consistant with good optical performance.

It is a further object to provide such an objective having a relative aperture as great as $f/3.8$ and field angle of at least 40° along with an excellent state of correction of spherical and chromatic aberrations, coma, astigmatism, distortion and field curvature over the entire field.

Further objects and advantages reside in the novel details of construction and arrangement of parts as set forth in the description herebelow taken in connection with the accompanying drawing, wherein:

FIG. 1 is an optical diagram showing an optical copying objective constructed according to the present invention;

FIG. 2 is a chart showing the principal constructional data relating to the objective shown in FIG. 1;

FIG. 3 is a graphical representation of the condition of spherical aberration in the image formed by the optical objective; and FIG. 4 is a graphical representation of the condition of tangential and sagittal astigmatism in said image.

Said optical objective is designated generally by the numeral 10 in FIG. 1 of the drawing, wherein the objective is diagrammatically shown. Comprised in the objective 10 are a pair of optically aligned singlet meniscus lens members which are concave toward each other. The singlet lens members have positive focal lengths and said members are designated I and VI beginning at the front or entrant side of the objective. Spaced between the lens members I and VI and optically aligned therebetween is a pair of doublet meniscus lens members having negative focal lengths, the members being concave toward a diaphragm 11 located substantially medianly therebetween. Each doublet lens member is composed of an outermost double convex lens element which is preferably cemented along an interface to a double concave lens element, the elements being designated successively II, III, IV and V.

Preferably, the construction of the objective 10 is strictly symmetrical so that the actual ratio of object distance to image distance of 1:1 is provided but slight adjustments can be made in the axial position of the diaphragm 11 without disturbing said ratio appreciably. Accordingly, the value of the positive focal length of both positive meniscus lens members I and VI should be as stated herebelow, $$.594\ F < F_I = F_{VI} < .656\ F$$

wherein $F_I$ and $F_{VI}$ designate respectively the focal lengths of the aforementioned I and VI lens members and F designates the equivalent focal length of the objective 10. Ideally, the value of $F_I$ and $F_{VI}$ should be .6251 F.

The aforesaid double convex lens elements in said doublet lens members are designated II and V and have positive focal length values as stated herebelow, $$.325\ F < F_{II} = F_V < .359\ F$$

wherein $F_{II}$ and $F_V$ designate respectively the focal lengths of the lens elements II and V. Ideally, the value of $F_{II}$ and $F_V$ should be .342 F.

Regarding the companion double concave lens elements which are designated III and IV, the value of their negative focal lengths is given herebelow, $$.205\ F < -F_{III} = -F_{IV} < .225\ F$$

wherein $-F_{III}$ and $-F_{IV}$ designate respectively the focal lengths of lens elements III and IV. Ideally, the value of $-F_{III}$ and $-F_{IV}$ should be .215 F.

In the objective 10, the high quality of optical performance, particularly with regard to spherical aberration, coma, tangential and sagittal astigmatism, field curvature and distortion over the entire field as well as an excellent chromatic difference of magnification, is assured partly by a proper choice of refractive index values and Abbe number values for the glasses from which the lens parts are made. The refractive index and Abbe number are designated by $n_D$ and $\nu$ respectively and said values are further chosen from among the lower-cost glasses having index values in the range 1.550 to 1.600.

Furthermore, the choice of glasses is considered together with advantageous constructional data for achieving the aforementioned correction of image aberrations. The excellent condition of correction in the image for spherical aberration in an objective having a relative aperture as large as $f/3.8$ is shown in FIG. 3. As shown diagrammatically in FIG. 4, the tangential and sagittal astigmatism in said image is reduced to a very low value considering the comparatively wide maximum field angle of 40° for which the objective is designed.

The effective values of said data with respect to the successive lens surface radii $R_1$ to $R_{10}$, the successive lens thicknesses $t_1$ to $t_6$, the interlens axial spaces $S_1$ to $S_4$, along with the values of $n_D$ and $\nu$ for each lens element I to VI are as specified herebelow in the table of mathematical statements, the minus (—) sign used with certain R values meaning that such surfaces have their centers of curvature located on the entrant side of their apices so that such surfaces are concave toward the front of the objective.

$$.269F < R_1 = -R_{10} < .297F$$
$$1.209F < R_2 = -R_9 < 1.335F$$
$$.306F < R_3 = -R_8 < .338F$$
$$.443F < -R_4 = R_7 < .489F$$
$$.1665F < R_5 = -R_6 < .1835F$$
$$.0409F < t_1 = t_6 < .0451F$$
$$.0568F < t_2 = t_5 < .0628F$$
$$.0218F < t_3 = t_4 < .0242F$$
$$.0022F < S_1 = S_4 < .0024F$$
$$.0637F < S_2 = S_3 < .0707F$$
$$\left.\begin{array}{l}1.567 < n_D(I) = n_D(VI) < 1.577 \\ 1.567 < n_D(II) = n_D(V) < 1.577 \\ 1.578 < n_D(III) = n_D(IV) < 1.588 \\ 52.0 < \nu(I) = \nu(VI) < 62.0 \\ 52.0 < \nu(II) = \nu(V) < 62.0 \\ 41.0 < \nu(III) = \nu(IV) < 51.0\end{array}\right\} \text{Absolute values}$$

More specifically, the values of the aforementioned constructional properties of the objective 10 for one preferred form thereof are substantially given in the table herebelow, $$R_1 = -R_{10} = .283F$$
$$R_2 = -R_9 = 1.272F$$
$$R_3 = -R_8 = .322F$$
$$-R_4 = R_7 = .466F$$
$$R_5 = -R_6 = .175F$$
$$t_1 = t_6 = .0430F$$
$$t_2 = t_5 = .0598F$$
$$t_3 = t_4 = .0230F$$
$$S_1 = S_4 = .0023F$$
$$S_2 = S_3 = .0670F$$
$$\left.\begin{array}{l}n_D(I) = n_D(VI) = 1.5725 \\ n_D(II) = n_D(V) = 1.5725 \\ n_D(III) = n_D(IV) = 1.5838 \\ \nu(I) = \nu(VI) = 57.4 \\ \nu(II) = \nu(V) = 57.4 \\ \nu(III) = \nu(IV) = 46.0\end{array}\right\} \text{Absolute values}$$

Stated entirely in numerical values, the constructional data for said preferred form of the present invention are given in the chart herebelow wherein, E.F. and B.F. designate respectively the equivalent focal length and back focal length, $R_1$ to $R_{10}$ represent the radii of the successive lens surfaces of the lens parts I to VI, the surfaces which are concave toward the front being designated by the minus (—) sign, $t_1$ to $t_6$ represent the axial thicknesses of said lens parts, $S_1$ to $S_4$ designate the successive interlens axial air spaces, $n_D$ designates the refractive index of the glass used in said lens parts, and $\nu$ represents the Abbe numbers of the glass in said parts.

E.F.=100 mm.   F.F.=B.F.=77.56 mm.   f/3.8   F.A.=40°

| Lens | Radii | Thicknesses | Spaces | $n_D$ | $\nu$ |
|---|---|---|---|---|---|
| I | $R_1$=28.27<br>$R_2$=127.15 | $t_1$=4.30 | $S_1$=0.23 | 1.5725 | 57.4 |
| II | $R_3$=32.17<br>$-R_4$=46.57 | $t_2$=5.98 | $S_2$=6.70 | 1.5725 | 57.4 |
| III | $R_5$=17.52 | $t_3$=2.30 | | 1.5838 | 46.0 |
| IV | $-R_6$=17.52<br>$R_7$=46.57 | $t_4$=2.30 | $S_3$=6.70 | 1.5838 | 46.0 |
| V | $-R_8$=32.17 | $t_5$=5.98 | $S_4$=0.23 | 1.5725 | 57.4 |
| VI | $-R_9$=127.15<br>$-R_{10}$=28.27 | $t_6$=4.30 | | 1.5725 | 57.4 |

All scalar quantities given in millimeters.

Although only one form of the invention has been shown and described in detail, other forms are possible and changes and substitutions may be made within the structural limits claimed without departing from the spirit of the invention as defined in the appended claims.

I claim:

1. A symmetrical type optical objective having a field angle of 40° and relative aperture of f/3.8 and used for copy and process operations, said objective having an excellent correction for spherical and chromatic aberrations, coma, astigmatism, distortion and field curvature, each half of said objective consisting of an outer singlet positive meniscus lens member and a doublet negative meniscus member spaced inwardly therefrom, each half being equally spaced from an intervening diaphragm, the lens elements of the doublet member being an outer double convex element in contact with a double concave element and having a common interface which is convex toward said diaphragm, said objective having a long back focus of at least 75 percent of the equivalent focal length thereof which is represented by the symbol F, the values of the constructional data for said objective being set forth substantially in the table of mathematical statements herebelow wherein $R_1$ to $R_{10}$ represent the radii of the successive lens surfaces, the minus (—) sign used with certain R values applying to those surfaces which are concave toward the front of the objective, $t_1$ to $t_6$ represent the successive lens thicknesses, $S_1$ and $S_4$ represent the outer interlens spaces and $S_2$ and $S_3$ represent the spaces between the front and rear double concave elements and said diaphragm, the refractive index of the positive singlet lens members, the double convex lens element, and the double concave lens elements being designated respectively $n_D(I)$, $n_D(II)$ and $n_D(III)$ in the front half of said objective and being designated respectively $n_D(VI)$, $n_D(V)$ and $n_D(IV)$ in the rear half thereof, and the corresponding Abbe numbers thereof being designated respectively $\nu(I)$, $\nu(II)$, $\nu(III)$, $\nu(VI)$, $\nu(V)$ and $\nu(IV)$, $$R_1 = -R_{10} = .283F$$
$$R_2 = -R_9 = 1.272F$$
$$R_3 = -R_8 = .322F$$
$$-R_4 = R_7 = .466F$$
$$R_5 = -R_6 = .1750F$$
$$t_1 = t_6 = .0430F$$
$$t_2 = t_5 = .0598F$$
$$t_3 = t_4 = .0230F$$
$$S_1 = S_4 = .0023F$$
$$S_2 = S_3 = .0670F$$
$$\left.\begin{array}{l}n_D(I) = n_D(VI) = 1.5725 \\ n_D(II) = n_D(V) = 1.5725 \\ n_D(III) = n_D(IV) = 1.5838 \\ \nu(I) = \nu(VI) = 57.4 \\ \nu(II) = \nu(V) = 57.4 \\ \nu(III) = \nu(IV) = 46.0\end{array}\right\} \text{Absolute values}$$

2. A symmetrical type optical objective having 40° field angle and a relative aperture as large as f/3.8, said objective being used for copy and process operations, said objective having an excellent state of correction for spherical and chromatic aberrations, coma, astigmatism, distortion and field curvature, said objective comprising a pair of positive singlet meniscus lens members which are optically aligned and spaced apart, and a pair of doublet negative meniscus lens members which are spaced equally from an intervening diaphragm and from said inglet members, all of said members being concave toward said diaphragm, said doublet member being composed of an outer double convex lens element which lies in contact with a double concave lens element along an interface which is convex toward the diaphragm, the objective having numerical values for constructional data as specified in the chart of values herebelow wherein the singlet meniscus members are designated I and VI, the double convex lens elements are designated II and V, and the double concave lens elements are designated III and IV, the radii of the successive lens surfaces being designated $R_1$ to $R_{10}$ numbering from the object or front side of the objective, $t_1$ to $t_6$ represent the successive axial lens thicknesses, $S_1$ to $S_4$ represent the successive axial spaces, the axial spaces $S_2$ and $S_3$ being the front and rear axial airspaces which are located between the lens surfaces $R_5$ and $R_6$ respectively and the central diaphragm, and $n_D$ and $\nu$ represent respectively the refractive index and the Abbe number of the materials from which the lenses are made, the equivalent focal length, front focal length, and back focal length being designated respectively E.F., F.F. and B.F., and F.A. designates field angle,

| Lens | Radii | Thicknesses | Spaces | $n_D$ | $\nu$ |
|---|---|---|---|---|---|
| I | $R_1=28.27$<br>$R_2=127.15$ | $t_1=4.30$ | $S_1=0.23$ | 1.5725 | 57.4 |
| II | $R_3=32.17$ | $t_2=5.98$ | $S_2=6.70$ | 1.5725 | 57.4 |
| III | $-R_4=46.57$<br>$R_5=17.52$ | $t_3=2.30$ | | 1.5838 | 46.0 |
| IV | $-R_6=17.52$<br>$R_7=46.57$ | $t_4=2.30$ | $S_3=6.70$ | 1.5838 | 46.0 |
| V | $-R_8=32.17$ | $t_5=5.98$ | $S_4=0.23$ | 1.5725 | 57.4 |
| VI | $-R_9=127.15$<br>$-R_{10}=28.27$ | $t_6=4.30$ | | 1.5725 | 57.4 |

All scalar quantities given in millimeters.

No references cited.

JEWELL H. PEDERSEN, *Primary Examiner.*

R. J. STERN, *Assistant Examiner.*